United States Patent [19]

Kamimura et al.

[11] Patent Number: 4,967,361
[45] Date of Patent: Oct. 30, 1990

[54] ACTIVE-SUSPENSION CONTROLLING SYSTEM OF VEHICLES

[75] Inventors: Katsuyoshi Kamimura, Sano; Saiichiro Oshita, Ota; Atsushi Mine, Oizumi; Yutaka Hiwatashi, Ota; Toshihiro Konno, Ota, all of Japan

[73] Assignee: Fuji Jukogyo Kabushiki Kaisha, Tokyo, Japan

[21] Appl. No.: 404,049

[22] Filed: Sep. 6, 1989

Related U.S. Application Data

[63] Continuation of Ser. No. 181,650, Apr. 14, 1988, abandoned.

[30] Foreign Application Priority Data

Apr. 17, 1987 [JP] Japan .................................. 62-94951

[51] Int. Cl.$^5$ .............................................. B60G 13/00
[52] U.S. Cl. ............................... 564/424.05; 280/707
[58] Field of Search .................... 364/424.05; 280/707, 280/708, 840, DIG. 1; 318/615

[56] References Cited

U.S. PATENT DOCUMENTS

| | | | |
|---|---|---|---|
| 4,215,403 | 7/1980 | Pollard et al. | 280/707 |
| 4,579,366 | 4/1986 | Doi et al. | 280/6 H |
| 4,695,780 | 9/1987 | Kurakake et al. | 318/615 |
| 4,700,971 | 10/1987 | Doi et al. | 364/424 |
| 4,712,807 | 12/1987 | Kurosawa | 364/424 |
| 4,761,022 | 8/1988 | Ohashi et al. | 280/707 |

Primary Examiner—Gary Chin
Attorney, Agent, or Firm—Martin A. Farber

[57] ABSTRACT

An active suspension of a motor vehicle is controlled by a system and a method which comprise combining a controller and an actual flow quantity estimation circuit for estimating by logic operation the flow quantity of the fluid actually flowing through each control valve of the suspension with respect to a total desired flow quantity, and calculating the difference between the actual flow quantity value thus estimated and the desired flow quantity, thereby correcting the desired flow quantity. A command signals is generated and transmitted in accordance with the desired flow quantity thus corrected for operating the control valve to undergo opening/closing operation.

6 Claims, 1 Drawing Sheet

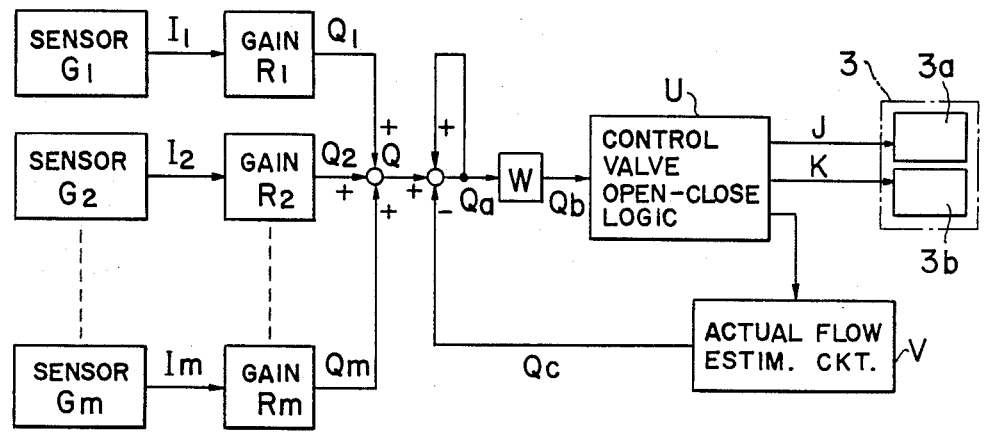
F I G. 1
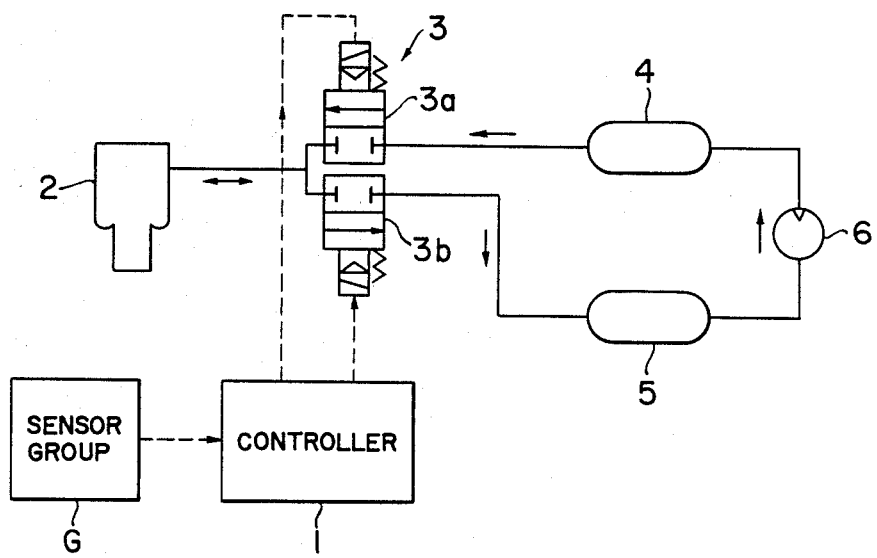
F I G. 2

ACTIVE-SUSPENSION CONTROLLING SYSTEM OF VEHICLES

RELATED APPLICATION

This application is a continuation of our co-pending application Ser. No. 07/181,650 filed Apr. 14, 1988, now abandoned.

BACKGROUND OF THE INVENTION

This invention relates generally to so-called active-suspension systems of vehicles, particularly motor vehicles, and more particularly to a system for controlling such suspension systems.

In a motor vehicle in which an air-suspension system is used, the air pressure in each air-suspension unit of the system is regulated by an air regulating system which ordinarily comprises a flow control valve having a charging-side valve and a discharging-side valve, a high-pressure tank connected to the charging-side valve, a low-pressure tank connected to the discharging-side valve, and an air compressor connected on its suction side to the low-pressure tank and on its delivery side to the high-pressure tank, and outlet and inlet ports respectively of the charging-side and discharging-side valves being connected to an air suspension unit. Ordinarily one air suspension unit is provided for each independent wheel of the vehicle.

In the following disclosure, descriptions are set forth with respect to a single suspension unit, for the most part, but it is to be understood that the descriptions are applicable to all suspension units.

The air compressor operates to draw air from the low-pressure tank, to compress this air, and to deliver the compressed air to the high-pressure tank. When the charging-side valve is opened, air at high pressure is supplied to the air-suspension unit, and, when the discharge-side valve is opened, the air in the air-suspension unit is discharged into the low-pressure tank. The air regulating system briefly described above is a so-called closed pneumatic circuit system which is known in the art, one disclosure thereof being set forth in Japanese Patent Publication No. 50-28589.

When a closed pneumatic circuit system as described above is provided in combination with a group of sensors for detecting the various motions of the air suspension units and a controller for controlling the opening and closing actions of the flow control valves in response to signals from the sensors, the air regulating system is an active suspension system capable of variably controlling the damping, spring action, and other characteristics of the air suspension units and also the attitude of the vehicle. An example of such a system will be described more fully hereinafter.

In an active suspension system as described above, a difference to some extent inevitably occurs between the desired flow quantity transmitted by the above-mentioned controller and the actual flow quantity of the air charged or discharged through each flow control valve, because of various causes such as dynamic time delay or delay in the riser portion of the valve characteristic at the time of valve operation. Accordingly, it is necessary to carry out compensatory correction for this difference.

One method of compensatorily correcting this difference which would appear to be possible is to measure the actual flow quantity by means of a flow quantity sensor such as a flow quantity meter and to feed back the difference between this measured actual flow quantity and the control desired flow quantity thereby to accomplish correction of the control desired flow quantity. This method, however, requires precise hardware such as flow quantity meters and the provision of feedback circuits. As a consequence, not only does the system become expensive, but the circuitry also becomes complicated, whereby it is considerably difficult to reduce this method to practice.

SUMMARY OF THE INVENTION

According to this invention in one aspect thereof, briefly summarized, there is provided a method of controlling an active suspension system of a vehicle, said active suspension system comprising a fluid suspension system made up of a plurality of suspension units and containing a sealed-in fluid, sensors for detecting various motions of the suspension units, a controller operating in response to sensor signals from said sensors to determine a total desired flow quantity of the fluid to be charged into or discharged from the suspension units and to output command signals on the basis of said total desired flow quantity, and control valves operating in response to said command signals to undergo opening/closing operation thereby to cause the fluid to be charged into or discharged out from the suspension units, whereby various characteristics of the suspension units are variably controlled, said method comprising combining said controller and an actual flow quantity estimation circuit for estimating by logic operation the flow quantity of the fluid actually flowing through each control valve with respect to the total desired flow quantity, calculating the difference between said actual flow quantity value thus estimated and said desired flow quantity, thereby correcting said instruction flow quantity, and generating and transmitting in accordance with the desired flow quantity thus corrected said command signal for operating said control valve to undergo said opening/closing operation.

According to this invention in another aspect thereof, there is provided a control system for controlling an active suspension system of a vehicle as described above, said control system comprising, in combination with the sensors, the controller, and the control valves: an actual flow quantity estimation circuit for estimating by logic operation the flow quantity of the fluid actually flowing through each control valve with respect to the total desired flow quantity; means for calculating the difference between the actual flow quantity thus estimated and the desired flow quantity and correcting the instruction flow quantity on the basis of said difference; and means for operating in response to the desired flow quantity thus corrected to generate and transmit the command signal for operating each control valve to undergo the opening/closing operation.

In the above-described control system, the actual flow quantity estimation circuit determines by logic operation the estimated actual flow quantity value on the basis of data obtained from experiments on the actual flow quantity through the pertinent control valve when the control valve on or off signal is applied. For this reason, even a digital valve opening/closing action which is not smooth takes place, and the quantity of the fluid actually flowing through the valve is accurately estimated.

Furthermore, the means for correction obtains a new desired flow quantity on the basis of the difference between the desired flow quantity and the estimated actual flow quantity determined by the actual flow quantity estimation circuit. In other words, the new desired flow quantity is obtained by adding the difference and a total desired flow quantity, whereby there is achieved a result substantially equal to the charging and discharging quantities of the flow quantity portion designated on the basis of the sensor signals.

The nature, utility, and further features of this invention will be more clearly understood from the following detailed description with respect to a preferred embodiment of the invention when read in conjunction with the accompanying drawing briefly described below.

BRIEF DESCRIPTION OF THE DRAWINGS

In the accompanying drawings:

FIG. 1 is a block diagram of an example of a control system constituting the preferred embodiment of the invention; and FIG. 2 is a simplified pneumatic circuit diagram illustrating one example of an active suspension system to which the invention can be applied.

DETAILED DESCRIPTION OF THE INVENTION

As conducive to a full understanding of this invention, the air or pneumatic suspension system described hereinbefore will first be briefly described with reference to FIG. 2.

As mentioned hereinbefore, the pressure in each air-suspension unit of the system is regulated by an air regulating system which, as shown in FIG. 2, ordinarily comprises a flow control valve 3 having a charging-side valve 3a and a discharging-side valve 3b, a high-pressure air tank 4 connected to the charging-side valve 3a, a low-pressure air tank 5 connected to the discharging-side valve 3b, and an air compressor 6 connected on its suction and delivery sides to the low-pressure and high-pressure tanks 5 and 4, respectively. The outlet and inlet ports respectively of the charging-side and discharging-side valves 3a and 3b are connected to an air suspension unit 2.

The closed pneumatic circuit of the above-described organization with its operation as described hereinbefore is provided in combination with a group of sensors G. These sensors are provided for detecting the various motions of the air suspension units and a controller 1 is provided for controlling the opening and closing actions of each flow control valve 3 in response to signals from the sensors G. Thus an active suspension system is obtained.

However, as mentioned hereinbefore, a difference unavoidably occurs between the desired flow quantity transmitted by the controller 1 and the actual flow quantity of the air charged or discharged through each flow control valve 3 and requires compensatory correction. Also as mentioned hereinbefore, a fully satisfactory solution to this problem has not yet been discovered in the prior art.

A solution to this problem has been achieved by this invention, which will now be described in detail with respect to one embodiment thereof with reference to FIG. 1 indicating one example mode of control of the controller 1 shown in FIG. 2.

As indicated in FIG. 1, the controller 1 operates to multiply gains $R_1, R_2, \ldots R_m$ respectively by sensor signals $I_1, I_2, \ldots I_m$ outputted by sensors $G_1, G_2, \ldots G_m$ which respectively detect the various characteristics of motion of the air suspension units such as, for example, vertical (up-and-down) acceleration, vertical displacement velocity, and vertical displacement, to determine desired flow quantities $Q_1, Q_2, \ldots Q_m$ for every sensor signal, and, by adding these, calculate a total desired flow quantity Q.

Furthermore, a compensatory correction, as described hereinafter, is applied to this total desired flow quantity Q to obtain a corrected desired flow quantity $Q_a$. This corrected desired flow quantity $Q_a$ is passed through a filter W representing a characteristic, which is selected taking into consideration of the valve characteristics indicting the limitation of a quantity such as the maximum flow quantity passing through the flow control valve 3 at the maximum opening degree of the valve, and is converted into an actual desired flow quantity $Q_b$, which is fed into a control valve open-close logic U.

This control valve on-off logic U outputs control valve on-off valve signals J and K, in, respectively, in response to the actual desired flow quantity $Q_b$ thereby operating the charging-side valve 3a or the discharging-side valve 3b of the flow control valve 3, thus supplying or discharging air to or from each air suspension unit 2.

In the above-described pneumatic system, a drop in the air flow quantity occurs because of various causes such as dynamic time delay of the flow control valve 3 when it undergoes opening or closing operation or delay in the flow quantity of the air passing through the valve. Furthermore when the flow control valve undergoes opening/closing operation in response to the above mentioned control valve open-close signal J or K, the actual flow quantity of the air becomes less than the desired air flow quantity.

Accordingly, in the practice of this invention, an actual flow quantity estimation circuit V for estimating the flow quantity of air actually passing through the valve is provided with respect to the control valve on-off signals J and K. The difference between an estimated actual flow quantity $Q_c$ determined by an operation in this actual flow quantity estimation circuit V and the aforementioned corrected desired flow quantity $Q_a$ as a feedback value is added to the total desired flow quantity Q calculated on the basis of the sensor signals $I_1, I_2, \ldots I_m$ thereby to carry out correction control.

The actual flow quantity estimation circuit V operates to determine by an operation an estimated value of the actual quantity of air which has passed through the flow control valve 3. This is performed on the basis of data obtained by experiments on the air flow quantity of air actually passing through the flow control valve 3 when the control valve on-off signals J and K are applied, with the valve opening time as a parameter.

The above-described control can be expressed by mathematical equations as follows.

$$Q_a = Q + (Q_a - Q_c) \qquad (1)$$

$$Q_b = WQ_a \qquad (2)$$

$$Q_c = UVQ_b \qquad (3)$$

From the above Eqs. (2) and (3), $$Q_a = \frac{Q_b}{W} = \frac{1}{WUV} Q_c \quad (4)$$

When Eq. (4) is substituted in Eq. (1), $$\frac{1}{WUV} Q_c = Q + \left(\frac{1}{WUV} - 1\right) Q_c \quad (5)$$

Thus, when the above described correction is carried out, control valve on-off signals J and K can be generated of a character such that the estimated actual flow quantity $Q_c$ will coincide with the required total desired flow quantity Q calculated from the sensor signals.

This invention has been described above with respect to an example of application thereof to an air suspension system in which air is used as a spring, but the invention is not thus limited. More specifically, if the closed gas (air) circuit is so constructed and arranged that a balance between the charging and discharging of the gas is amply maintained, and there is almost no necessity of replenishing or discharging the gas into or out of the closed circuit, any suitable gas other than air can be used in place of air.

Furthermore, while a flow quantity control valve is used in the above-described example, the control system may have an organization wherein a pressure control valve other than a flow quantity control valve is used. Here the controller calculates from the signals of the sensors an desired flow quantity of the gas which is to be charged or discharged and generates and transmits a signal for variably controlling the pressure setting value of the pressure control valve so as to cause the charging or discharging of a gas quantity corresponding to that desired flow quantity.

It is to be noted that this invention is applicable also to vehicles in which hydropneumatic suspensions and hydraulic suspensions are used. In such a case, control is achieved by a mode wherein, by opening either the charging-side valve or the discharging-side valve of a flow control valve in response to a valve on and off signals from the controller. The oil (hydraulic fluid) which is stored and maintained by an oil pump under a specific pressure within an accumulator is charged into an oil cylinder of the suspension, or the oil within an oil cylinder of the suspension is drained into a reservoir.

According to this invention, as described above, there is provided a method and system for controlling an active suspension in which a controller operates in response to sensor signals from sensors for detecting various motion characteristics. Signals are generated and transmitted which cause control valves to supply and discharging fluid to and from the suspension units to undergo opening/closing action so as to variably control the damping, spring, and other characteristics of the suspension units. At the same time, attitude control of the vehicle is performed. This control method and system according to this invention have the following effectiveness and features of merit.

In this control system, an actual flow quantity estimation circuit is provided for estimating by logic operation the flow quantity of the fluid actually passing through the control valve with respect to the total desired flow quantity of air determined on the basis of the above-mentioned sensor signals. The difference between the actual flow quantity estimation value determined by this actual flow quantity estimation circuit and the total desired flow quantity is calculated to correct the total desired flow quantity. Signals are generated for causing the control valves to undergo opening/closing action in response to this corrected desired signal. Therefore, even when the valve opening/closing action is digitally not smooth, the actual flow quantity is accurately followed. Moreover, mechanical flow quantity sensors for measuring the actual flow quantity and complicated circuitry such as feedback circuits for feedback from such mechanical sensors are not necessary. Thus, with a relatively simple and inexpensive system, precise control of the charging or discharging of the fluid of the suspension can be accomplished, and an active suspension of excellent dynamic performance can be realized in a practical manner.

What is claimed is:

1. A control system for controlling an active suspension system of a vehicle, said active suspension system having a fluid suspension system made up of a plurality of suspension units and containing a sealed-in fluid, sensors for detecting motions of the suspension units, a controller operating in response to sensor signals from said sensors to determine a desired flow quantity of the fluid to be charged into or discharged from the suspension units and to output command signals on the basis of said desired flow quantity, control valves operating in response to said command signals to undergo on-off operation thereby to cause the fluid to be charged into or discharged out from the suspension units, the improvement of said control system comprising:

a flow quantity estimation circuit for estimating the flow quantity of the fluid flowing through each control valve;

means for calculating a corrected desired flow quantity by adding the difference between said flow quantity thus estimated by the quantity estimation circuit and a preceding desired flow quantity to said desired flow quantity determined by said controller based on the sensor signals; and means in response to the corrected desired flow quantity to generate and transmit said command signals for operating each control valve to undergo said on-off operation.

2. The system according to claim 1, wherein said control valves are pressure control valves.

3. A method of controlling an active suspension system of a vehicle, said active suspension system having a fluid suspension system made up of a plurality of suspension units and containing a sealed-in fluid, sensors for detecting motions of the suspension units, and a controller operating in response to sensor signals from said sensors to determine a desired flow quantity of the fluid to be charged into or discharged from the suspension units and to output command signals on the basis of said desired flow quantity, and control valves operating in response to said command signals to undergo on-off operation thereby to cause the fluid to be charged into or discharged out from the suspension units, the improvement of the method comprising:

estimating the flow quantity of the fluid flowing through each control valve by a flow quantity estimation circuit, calculating a corrected desired flow quantity by adding the difference between said flow quantity thus estimated by the flow quantity estimation circuit and preceding desired flow quantity to said desired flow quantity determined by said controller based on the sensor signals and generating and transmitting in accordance with the corrected desired flow quantity said command signals for operating said control valves to undergo said on-off operation thereof.

4. In a control system for controlling an active suspension system of a vehicle having a plurality of suspension units each including a fluid chamber and an on-off type flow control valve mounted on each suspension unit, respectively, to control a fluid quantity in said fluid chamber, respectively, sensing means for detecting actuating conditions of a suspension unit of the suspension units and for producing a suspension signal, and means responsive to the suspension signal for calculating a desired fluid quantity to supply to said suspension unit and for producing a desired fluid quantity signal depending on the actuating conditions of the suspension unit, the improvement in the system which comprises adding means for correcting said desired fluid quantity signal to produce a corrected desired fluid quantity signal, filter means for filtering said corrected desired fluid quantity signal by multiplying the latter with a predetermined coefficient representing a maximum flow quantity passing through said on-off type flow control valve, and for producing a filtered desired fluid quantity signal, valve control means responsive to said filtered desired fluid quantity signal for calculating a duty ratio representing on and off conditions of the on-off type flow control valve and for producing on and off signals to control the supplying of the fluid quantity to the suspension unit, flow estimating means for estimating the fluid quantity passing through said control valve and producing a corresponding estimated fluid quantity signal, and said adding means calculating said corrected desired fluid quantity signal by adding to said desired fluid quantity signal a preceding corrected desired fluid quantity signal minus said estimated fluid quantity signal, so as to correct said fluid quantity supplied to said suspension unit.

5. The system according to claim 4, wherein said on-off type flow control valve comprises a charging-side valve responsive to said on and off signals for charging the corrected fluid quantity, and a discharging-side valve responsive to said on and off signals for discharging said corrected fluid quantity.

6. The system according to claim 4, wherein said flow estimating means estimates the fluid quantity actually passing through said control valve based on said filtered desired fluid quantity signal and data of the flow control valve.

* * * * *